United States Patent
Choudhary et al.

(10) Patent No.: US 12,158,346 B1
(45) Date of Patent: Dec. 3, 2024

(54) SYSTEMS AND METHODS FOR PREDICTING A STOP LOCATION IN A VEHICLE ROUTING SYSTEM

(71) Applicant: Zum Services, Inc., Redwood City, CA (US)

(72) Inventors: Rashmi Choudhary, Tracy, CA (US); Constantine Gerasimovich, San Franciso, CA (US); Andrew Mormysh, Redwood City, CA (US); Abhishek Garg, Los Altos, CA (US); Himanshu Arora, Newark, CA (US)

(73) Assignee: Zum Services, Inc., Redwood City, CA (US)

( * ) Notice: Subject to any disclaimer, the term of this patent is extended or adjusted under 35 U.S.C. 154(b) by 0 days.

(21) Appl. No.: 18/660,948

(22) Filed: May 10, 2024

(51) Int. Cl.
   *G06Q 50/40* (2024.01)
   *G01C 21/34* (2006.01)

(52) U.S. Cl.
   CPC ......... *G01C 21/3407* (2013.01); *G06Q 50/40* (2024.01)

(58) Field of Classification Search
   CPC .......................... G01C 21/3407; G06Q 50/40
   See application file for complete search history.

(56) References Cited

U.S. PATENT DOCUMENTS

| | | |
|---|---|---|
| 2013/0311076 A1 | 11/2013 | Mieth et al. |
| 2019/0063938 A1 | 2/2019 | Fukushima et al. |
| 2019/0226855 A1 | 7/2019 | Fu et al. |
| 2020/0208998 A1 | 7/2020 | Xiang et al. |
| 2021/0088349 A1 | 3/2021 | Li |
| 2021/0293557 A1 | 9/2021 | Vigild et al. |
| 2022/0018674 A1 | 1/2022 | Xu et al. |
| 2022/0252401 A1 | 8/2022 | Lupu et al. |
| 2022/0326032 A1 | 10/2022 | Liemhetcharat |
| 2022/0404162 A1 | 12/2022 | Williams et al. |

OTHER PUBLICATIONS

U.S. Appl. No. 18/660,741, "Non-Final Office Action", Jul. 5, 2024, 20 pages.
U.S. Appl. No. 18/660,644, "Notice of Allowance", Jul. 17, 2024, 6 pages.

*Primary Examiner* — Mathew Franklin Gordon
(74) *Attorney, Agent, or Firm* — Kilpatrick Townsend & Stockton LLP

(57) ABSTRACT

A system and method include server computer which may generate a route service request to service a route with a vehicle and identify a start location for the route and one or more stop locations of the route based on historical data associated at least with one of the route or the vehicle. The server computer may proceed to determine a probability that each of the one or more stop locations for the route will be serviced by the vehicle for the route and automatically select, based on the probability associated with each one of the one or more stop locations for the route, a subset of stop locations among the one or more stop locations. The server computer may then assign the subset of stop locations to the route, and transmit routing navigation instructions to a device associated with the vehicle.

20 Claims, 6 Drawing Sheets

SYSTEMS AND METHODS FOR PREDICTING A STOP LOCATION IN A VEHICLE ROUTING SYSTEM

CROSS-REFERENCES TO RELATED APPLICATIONS

None.

BACKGROUND OF THE INVENTION

The present application discloses systems and methods for routing a fleet of vehicles, scheduling stops, identifying the locations where the stops are to occur, and optimizing those routes and stops based on one or more elements of primary concern.

Today, massive fleets of vehicles are owned by both governmental and private institutions to facilitate the transport of goods and passengers, which is a major logistics endeavor. Fleet vehicles may have routes which are traveled on a periodic basis to serve customers in various capacities. For example, mail is delivered to virtually every home in the United States on a daily basis by mail carriers in individual trucks. Other private mail or companies and goods delivery companies also have fleets of trucks to provide mail service for individual customers. Similarly, local governmental entities operate bus lines for mass transit of passengers, typically in and out of big cities. Public bus lines, for example, use main routes with spurs that serve residential areas of a city to facilitate passengers traveling into and out from the city on a daily basis. Both public and private schools operate bus lines to safely transport children to and from school on a daily basis. School buses, however, usually operate based on stopping at certain places at certain times to safely load children to attend local schools and, for that reason, travel routes that are based on where children live, generally speaking.

Logistics for these fleets are incredibly complex. Maintenance, location, routing, fueling, and driver support are also considerations for fleet vehicles in order to deliver passengers or goods to a particular place by a particular time. In the context of school buses, a bus may be late because of a breakdown, construction delays, fuel problems, or a missing driver which may cause a child to be late for school. In particular, determining the stop locations for vehicles servicing routes is a significant element in the management of fleet logistics. Typically, conventional services provide a driver with an address for a stop. However, an address often still encompasses a relatively large area, especially if the address is for a school or a home, and there are many potential stop locations within an area defined by an address. This can result in numerous logistical issues. For example, at a school, this situation can become chaotic with various school buses jockeying for position to pick up or drop off students. While over time a driver may better learn the stop locations along a serviced route, this knowledge is known only to the driver of the route and an entire routing system can be thrown off in the event a single driver is replaced for a day.

It is, therefore, one object of this disclosure to provide a routing system which optimizes routes for a fleet vehicles. It is another object of this disclosure to provide a routing system which optimizes routing and stop locations for each vehicle in the fleet of vehicles. It is a further object of this disclosure to provide a method for optimizing routes and stop locations for fleet vehicles.

BRIEF SUMMARY OF THE INVENTION

Various embodiments provide a system that includes a server computer comprising a processor and a memory storing instructions that, when executed by the processor, cause the processor to perform steps comprising: generating a route service request to service a route with a vehicle, and identifying a start location for the route and one or more stop locations for the route based on a historical data associated at least with one of the route or the vehicle. The one or more stop locations may further include a destination stop location. The steps further comprise: determining a probability that each of the one or more stop locations for the route will be serviced by the vehicle for the route and automatically selecting, based the probability associated with each one the one or more stop locations for the route, a subset of stop locations among the one or more stop locations. Moreover, the steps further comprise, assigning the subset of stop locations to the route, and transmitting routing navigation instructions to a device associated with the vehicle.

In various embodiments, the one or more stop locations are identified in the routing navigation instructions as a GPS location.

In various embodiments, the instructions, when executed by the processor, cause the processor to perform steps further comprising: training a machine learning algorithm based on the one or more stop locations used by one or more vehicles assigned to travel between the start location and the destination stop location in one or more past instances, and implementing the machine learning algorithm to identify the subset of stop locations among the one or more stop locations for a current instances to travel between the start location and the destination stop location.

In various embodiments, the destination stop location is part of the subset of stop locations and is identified in the routing navigation instructions as a GPS location.

In various embodiments, a stop location among the subset of stop locations has a first set of coordinates when the vehicle or passengers assigned to the vehicle are of a first type, and the stop location has a second set of coordinates different than the first set of coordinates when the vehicle or passengers assigned to the vehicle are of a second type, wherein the first set of coordinates and the second set of coordinates are within a predetermined distance of each other.

In various embodiments, at least one of the subset of stop locations is based in part on a type of vehicle servicing the route or passengers assigned to the vehicle.

In various embodiments, at least one of the start location, one or more of the subset of stop locations, and the destination stop location is identified as a geographic zone.

In various embodiments, the server computer further collects route navigation data during performance of servicing the route.

In various embodiments, the instructions, when executed by the processor, cause the processor to perform steps further comprising: determining an arrival time to the destination stop location based on the subset of stop locations, wherein the arrival time is more accurate than an alternative arrival time calculated without using the probability associated with each one of the one or more stop locations for the route.

In various embodiments, the instructions, when executed by the processor, cause the processor to perform steps further comprising: the device associated with the vehicle displaying the routing navigation instructions.

Various embodiments provide a method comprising: generating, by a server computer, a route service request to service a route with a vehicle, and identifying, by the server computer, a start location for the route and one or more stop locations for the route based on a historical data associated at least with one of the route or the vehicle. The one or more stop locations may further include a destination stop location. The steps further comprise: determining, by the server computer, a probability that each of the one or more stop locations for the route will be serviced by the vehicle for the route and automatically selecting, by the server computer and based the probability associated with each one the one or more stop locations for the route, a subset of stop locations among the one or more stop locations. Moreover, the steps further comprise, assigning, by the server computer, the subset of stop locations to the route, and transmitting, by the server computer, routing navigation instructions to a device associated with the vehicle.

Various embodiments provide a non-transitory computer-readable medium storing instructions that, when executed on a server computer, cause the server computer to perform steps comprising: generating a route service request to service a route with a vehicle, and identifying a start location for the route and one or more stop locations for the route based on a historical data associated at least with one of the route or the vehicle. The one or more stop locations may further include a destination stop location. The steps further comprise: determining a probability that each of the one or more stop locations for the route will be serviced by the vehicle for the route and automatically selecting, based the probability associated with each one the one or more stop locations for the route, a subset of stop locations among the one or more stop locations. Moreover, the steps further comprise, assigning the subset of stop locations to the route, and transmitting routing navigation instructions to a device associated with the vehicle.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION OF THE INVENTION

The disclosure extends to vehicles of all types which are assembled into a fleet for a common purpose or goal such as, but not limited to, delivering passengers, delivering goods, or any other purpose.

In the following description of the disclosure, reference is made to the accompanying drawings, which form a part hereof, and in which are shown by way of illustration specific implementations in which the disclosure is may be practiced. It is understood that other implementations may be utilized, and structural changes may be made without departing from the scope of the disclosure.

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Various embodiments are described herein by using the illustrative use case of generating vehicle routing navigation instructions and determining one or more stop locations to provide optimal (e.g., selected) bus routes to a bus driver picking up and dropping off children between a start location and a destination stop location (e.g., a school). Although the vehicle routing system can provide routing navigation instructions with optimal stop locations to bus drivers, the embodiments of the present disclosure are not limited to use by bus drivers and/or routing buses nor are the embodiments limited to the transport of children. In particular, the vehicle routing system may be implemented by any suitable vehicle and/or fleet of vehicles. Moreover, the vehicle routing system may be implemented for the purpose of transporting passengers, goods, or any other suitable cargo. For example, the vehicle routing system may be employed by a fleet of delivery vehicles for transporting and delivering packages to customers.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
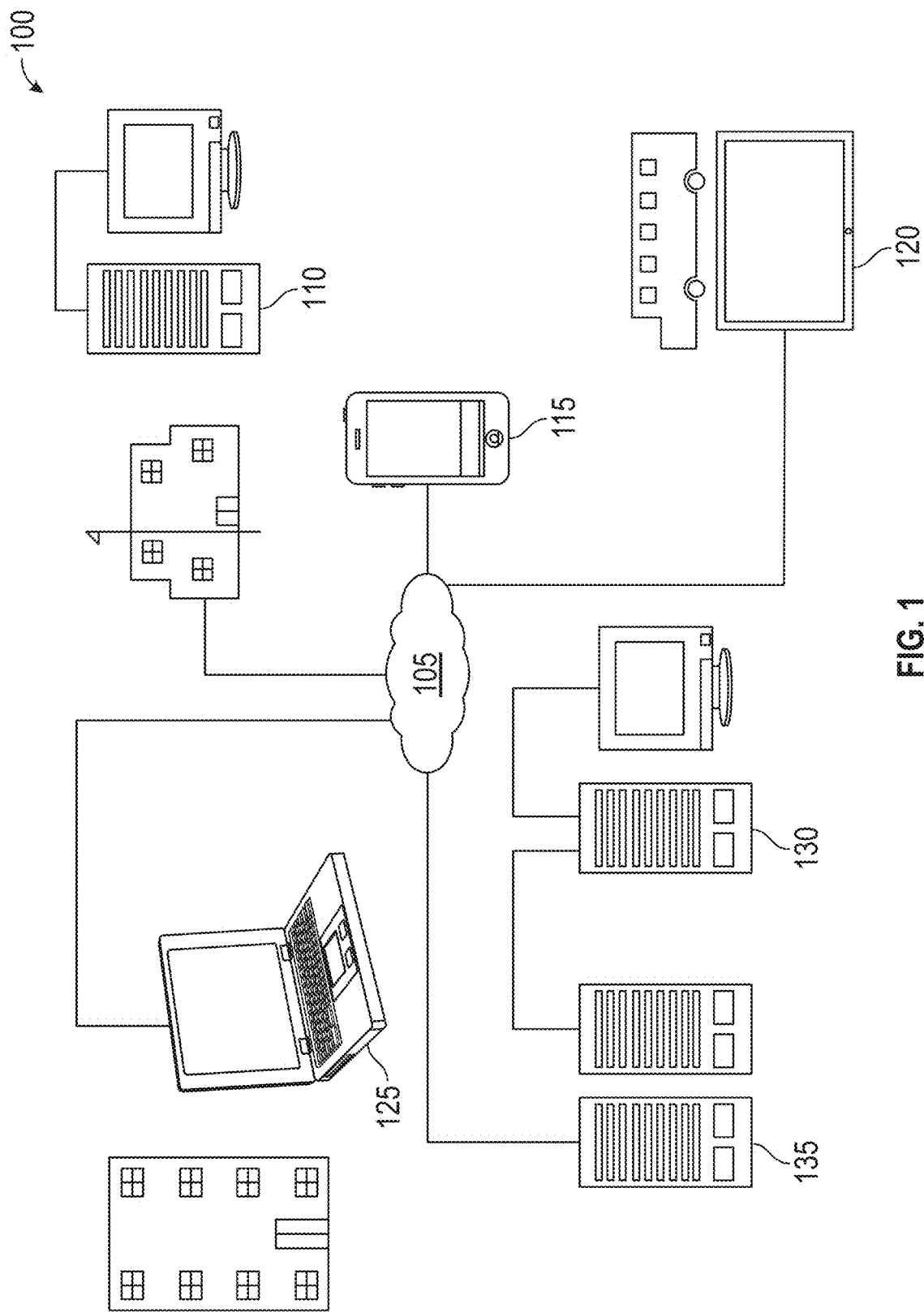
FIG. 1 illustrates a box diagram of a vehicle routing system, according to various embodiments.

FIG. 1 illustrates a box diagram of a vehicle routing system 100, according to various embodiments. As illustrated, the vehicle routing system 100 may include a communications network 105, a server computer 135, and various devices (e.g., a mobile phone, tablet device, computer, etc.) such as a ride requester device 110, a user device 115, a driver device 120, an administrator device 125, a provider device 130, etc. The vehicle routing system 100 may be used in conjunction with one or more vehicles of similar and/or varying types. For example, as described herein, one or more school buses in a fleet of school buses may implement the vehicle routing system 100.

Turning to the components of the vehicle routing system 100 in further detail. In some embodiments, a server computer 135 may be used to perform various operations of the vehicle routing system 100. For example, a server computer 135 may implement a route selection algorithm (e.g., a machine learning algorithm) to provide current and future selected routes to users and/or may be implemented to determine a particular subset of one or more stop locations to be services along a selected route. The server computer 135 may be implemented as one or more actual devices but is collectively referred to herein as a server computer 135. The server computer 135 may include one or more processors and one or more memory (e.g., one or more non-transitory computer-readable medium) storing instructions that, upon execution by the one or more processors, may cause the one or more processors to perform the operations described herein. In some embodiments, the server computer 135 may provide web-based access to the vehicle routing system 100 (or relevant portions of the vehicle routing system 100) based on which device 110, 115, 120, 125, 130 is associated with a particular function—e.g., a parent using a user device 115 may not have permissions to reroute buses, while an administrator using an administrator device 125 may have permission to reroute busses. The server computer 135 may include cloud computers, super computers, mainframe computers, application servers, catalog servers, communications servers, computing servers, database servers, file servers, game servers, home servers, proxy servers, stand-alone servers, web servers, combinations of one or more of the foregoing examples, and/or any other computing device that may be suitable to execute optimized routing and communication for a web-based vehicle routing system 100. The server computer 135 may include software and hardware modules, sequences of instructions, routines, data structures, display interfaces, and other types of structures that execute server computer 135 operations. Further, hardware components of the server computer 135 may include a combination of Central Processing Units ("CPUs"), buses, volatile and non-volatile memory devices, storage units, non-transitory computer-readable medium/storage media, data processors, processing devices, processors, control devices transmitters, receivers, antennas, transceivers, input devices, output devices, network interface devices, and other types of components that are apparent to those skilled in the art. These hardware components within the server computer 135 may be used to execute the various methods or algorithms, such as a route selection algorithm and/or a stop location selection algorithm, disclosed herein.

In some embodiments, the server computer 135 may interface with one or more devices 110, 115, 120, 125, 130 via a communications network 105, such as the Internet. The communications network 105 may be communicatively coupled to the server computer 135 as well as the one or more devices 110, 115, 120, 125, 130 to facilitates the access, storing, and/or exchange of information. The communications network 105 may be a wired, wireless, or both and may include one or more of any suitable communications path, such as a mobile network, a cable or fiber optics network, a WAN or LAN network, the Internet, or any other suitable means to facilitate communications in the vehicle routing system 100. Examples of these various internet connections include implementations using Wi-Fi, ZigBee, Z-Wave, RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a 5G network and its successors, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, or any other appropriate protocol to facilitate communication between the devices 110, 115, 120, 125, 130 and server computer 135.

In some embodiments, the vehicle routing system 100 may be implemented between a ride requester device 110, such as a school device, administrator device 125, or a user device 115, and a driver device 120. The various devices 110, 115, 120, 125, 130 described herein may be implemented by any suitable electronic device with processing power sufficient to share electronic information back and forth via the communications network 105. Example devices 110, 115, 120, 125, 130 include mobile phones, desktop computers, laptop computers, tablets, game consoles, personal computers, mobile devices, notebook computers, smart watches, and any other digital device that has suitable processing ability to interact with the server computer 135.

The ride requester device 110 may be implemented to select, schedule, and/or update routing. For example, a ride requester device 110 may be used to select one or more bus routes with a subset of stop locations for a particular school via a Graphical User Interface (GUI). In an embodiment, the ride requester device 110 may be a user device 115, a school and/or administrator device 125, or other suitable device capable of receiving input of and transmitting a route service requests. Input received by the ride requester device 110 may be associated with the generation and transmission of a route service requests for providing a ride service by one or more vehicles. For example, a parent of a student may use a user device 115 to request a ride service for their child, such as a bus pick up and/or drop off. Moreover, the ride requester device 110 may receive updated information (e.g., route navigation data) related to a route, request, vehicle, user, etc. For example, the administrator device 125 may receive updated information associated with a requested ride service, such as an updated suggested route or a new stop location associated with a future selected route, the status of the service, information concerning the vehicle performing the service, etc. This updated information may then be presented to a user of the ride requester device 110 via the GUI.

In an embodiments, a driver device 120 may be implemented in the vehicle routing system 100. The driver device 120 may be associated with a particular user or a particular vehicle. For example, a driver device 120 may be associated with a bus driver. The driver device 120 may further be a device which couples to a vehicle, such as via an Onboard Diagnostics II (OBD II) port. In an embodiment, the driver device 120 may be configured to interface with information associated with the vehicle, such as the vehicle's engine, operating systems, location, etc. For example, a driver device 120 may be coupled to a bus via an OBD II port and may collect, store, and/or transmit information associated to the coupled bus. Data collected via the driver device 120 may include route navigation data collected during the performance of servicing a route and may be transmitted to a server computer 135.

In an embodiment, one or more devices 110, 115, 120, 125, 130 may be provided with varying levels of authorization to access to the vehicle routing system 100 by use of server computers 135 and/or a provider device 130. For example, a school district may use one or more administrator devices 125 authorized to select, schedule, and/or update information associated with buses picking up and delivering children to a school. Alternatively, a user device 115 may only be authorized to select, schedule, and/or update information associated with one bus picking up and delivering one child associated with the user device 115. By providing the devices 110, 115, 120, 125, 130 with varying levels of authorization, various types of users with various levels of administration authorization may access and implement the vehicle routing system 100 according to their particular needs. For example, a provider device 130 may give a ride requester device 110 or an administrator device 125 access to the vehicle routing system 100 via the server computer 135 to create bus routing for a particular school district, school, bus, and/or user as appropriate.

In some embodiments, the server computer 135 may provide via a GUI a user interface for one or more of the devices 110, 115, 120, 125, 130. The user interface may be utilized to create, adjust, update, and/or present routes for particular individuals. For example, routes with particular stop locations may be generated for each child in a particular school district or school as appropriate and displayed on a ride requester device 110 via the GUI. Moreover, the one or more devices 110, 115, 120, 125, 130 associated with a particular may be configured to display routing navigation instructions associated with the particular vehicle via the GUI. For example, a driver device 120 associated with a vehicle may be configured to display routing navigation instructions transmitted to the driver device 120 by the server computer 135.

As described herein, the components of the vehicle routing system 100 may be utilized to generate and transmit a subset of one or more stop locations for a route based on the probability that the subset of stop locations for the route will be serviced by a vehicle servicing the route. For example, information associated with a ride requester device 110 (e.g., information associated with a child that requires pick up etc.), information associated with a driver device 120 (e.g., information associated with a vehicle, a driver, etc.), and historical data (e.g., data associated with past routes taken by various vehicles and/or riders, etc.) may be used by the vehicle routing system 100 to determine the probability that a particular driver will service each of the one or more stop locations along a suggested route. In turn, a subset of stop locations among the one or more stop locations may be selected and assigned to the route based on the determined probability. Routing navigation instructions including the subset of one or more stop locations may then be transmitted to a device associated with a vehicle servicing the route. By utilizing the vehicle routing system 100 in this manner, more efficient and accurate turn-by-turn navigation (e.g., routing navigation instructions) may be provided to a vehicle. Specifically, when a driver follows a suggested route/selected route including the subset of stop locations, not only is the number of communications between the driver device 120 and the server computer 135 reduced, but the number of requests for a new route based on route deviation is reduced, which, in turn, reduces the overall processing power necessary to supply turn-by-turn navigation to each vehicle in a fleet of vehicles. Moreover, arrival time to the stop locations including the destination stop location may be calculated in a more accurate manner. That is, if there are no or minimal changes to the suggested route and the most probable stop locations are known, the trip duration can be calculated accurately based on up-to-date (e.g., real time) information about traffic, weather, road conditions etc. on the known (e.g., recommended) route. As a result, the vehicle routing system 100 may provide increased energy and cost savings.

Figure 2:
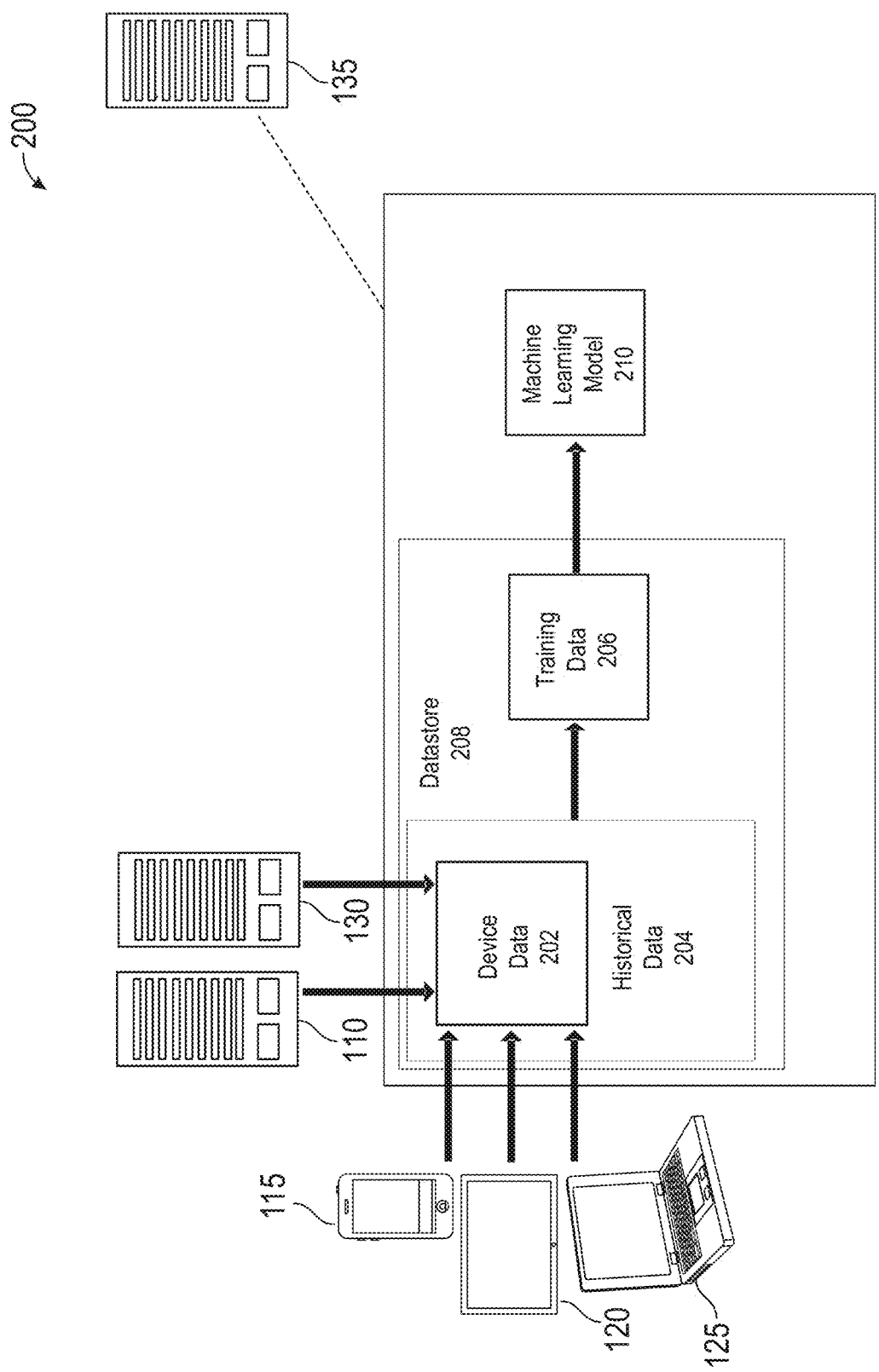
FIG. 2 illustrates a diagram of an exemplary machine learning process utilizing data to provide routing navigation instructions, according to various embodiments.
Figure 3:
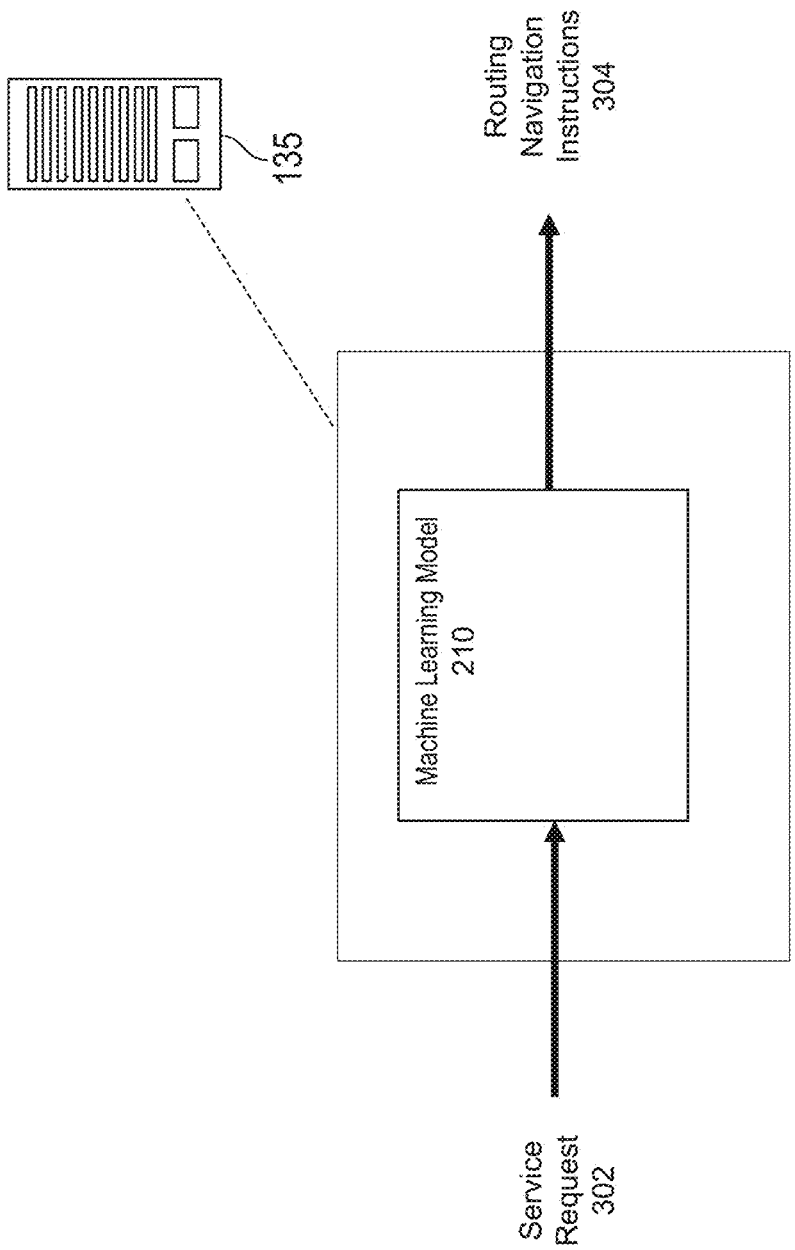
FIG. 3 illustrates an exemplary machine learning model for optimizing routing navigation instructions, according to various embodiments.

FIG. 2 illustrates a diagram of an exemplary machine learning process 200 utilizing data 202, 204 to provide routing navigation instructions, according to various embodiments. In an example, training data 206, which may include device data 202 and historical data 204 (e.g., routing navigation data), may be collected and/or stored in a datastore 208 accessible by the server computer 135. In turn, the training data 206 may be used to train a machine learning model 210 and/or a route selection algorithm (e.g., machine learning algorithm) to output routing navigation instructions 304, as illustrated in FIG. 3. By using machine learning and artificial intelligence techniques, differences may be identified between a suggested route associated with the routing navigation instructions 304 for a past instance and the route actually taken in the past instance by a single driver, a plurality of drivers, or a fleet of drivers. For example, frequently, drivers may have a route that they favor with particular stop locations commonly serviced or, while traveling along a route, may adjust a route based on traffic conditions, number of passengers being serviced by the vehicle, or for other reasons. Over a certain number of trips, the server computer 135 may implement a machine learning model 210 to train a route selection algorithm to determine, for a start location along a give route, which stop locations for the route are most likely to be serviced by a driver in a current instance of travel based on which stop locations along the route have been previously serviced in past instances of travel by that driver, a plurality of drivers, or a fleet of drivers. It should be noted that while the system and methods are described herein as utilizing a machine learning model 210, any suitable machine learning and/or artificial intelligence technique may be used. For example, a machine learning process implementing a neural network as opposed to an alternative machine learning algorithm or route selection algorithm may be implemented to output routing navigation instructions 304 including one or more stop locations for current instances and/or future instances of travel by a vehicle between a start location and a destination stop location.

In an embodiment, the training data 206 may include historical data 204 and/or device data 202, such as route navigation data. The historical data 204 and/or device data 202 may be collected by various devices 110, 115, 120, 125, 130 associated with the vehicle routing system 100. For example, device data 202 related to the driving history of a particular bus or driver may be collected by the driver device 120 and transmitted to the server computer 135 for storage in a datastore 208. In an embodiment, each device 110, 115, 120, 125, 130 may be configured to detect particular information associated with the device 110, 115, 120, 125, 130 and/or the user of the device 110, 115, 120, 125, 130 and transmit the information as data 202, 204 to the server computer 135 via the communications network 105. For example, the driver device 120 may detect information related to a particular bus ride and transmit the information as device data 202 to the server computer 135. Data 202, 204 transmitted by the driver device 120 to the server computer 135 may include distance traveled information, fuel use information, pickup duration information, stop location information (e.g., information about where the stop is designated versus where the stop actually occurred), speed of travel information (in terms of actual speeding and in terms of slowdowns caused by traffic, construction, or any other road condition), rider verification information, rider disembarking information, vehicle arrival times, and any other information that may be used by the server computer 135 to optimize routing. In some embodiments, the device data 202 and/or the historical data 204 may include route navigation data collected during the performance of servicing particular routes. For example, route navigation data indicating one or more stop locations commonly taken by a vehicle along a route may be collected by the server computer 135 and stored at the datastore 208. In some embodiments, the device data 202 may include data associated with a particular user of a device 110, 115, 120, 125, 130. For example, a user of a ride requester device 110 (e.g., a user device 115) may employ the ride requester device 110 to create a user profile. In response, data 202 associated with said user profile may be stored in non-volatile non-transitory computer readable medium and/or may be transmitted and stored along with other device data 202 in a datastore 208 at the server computer 135. User profiles may be created for various users of the vehicle routing system 100 and transmitted to the server computer 135 as device data 202. For example, a profile may be created for each driver and/or child in a particular school district or school. A user profile may include information such as a unique user identification, routes associated with the user, starting and ending locations (e.g., stop locations) associated with the user, etc.

According to various embodiments, the system may take into consideration the age of the historical data (e.g., data associated with past routes taken by various vehicles and/or riders, etc.). For example, a historical data element may be weighed by (e.g., multiplied with) the weight associated with the data. This way, newer data may be prioritized and older data may be de-prioritized. For example, a driver may have preferred a first route because there is a road closure along a second route. This preference is likely to be valid for a period of time (e.g., 1-7 days) but unlikely to be valid after the period of time (e.g., road closure is unlikely to last more than a week). Accordingly, data associated with relatively large weights (e.g., recent data) may have more influence in the analysis than the data that have smaller weights (e.g., older data). For example, each element of the historical data 204 may be associated with a coefficient indicative of an age of the element of the historical data 204. This way, embodiments may incorporate recency of historic data in the probability calculation.

In some embodiments, the device data 202 and/or historical data 204 may be collected and transmitted to a server computer 135 where the data 202, 204 may be stored using one or more datastores 208, such as a database, data table, or any other data storage mechanism suitable for storing data. For example, the datastore 208 may include tables relating particular users with particular vehicle routes and particular stop locations. In some embodiments, the data 202, 204 may be maintained at the datastore 208 using one or more tables. The one or more tables may include entries of data representing routes with particular stop locations that one or more vehicles serviced in past instances. The one or more tables may further include entries of data representing GPS data for one or more vehicles. For example, data stored in a datastore 208 representing GPS locations may identify one or more stop locations along a serviced route using a set of coordinates or an identified geographic zone. The one or more tables may further include entries of data representing the type of vehicle(s) servicing a route and/or passengers assigned to vehicle(s) servicing the route. In an embodiment, the one or more tables in the datastore 208 may be continuously and/or intermittently updated as information is received at the server computer 135. In particular, stop locations identified in the datastore table may be updated after each ride to update the training data 206. For example, a route identified in the datastore table may be updated to include a new stop location, which may then be included in a future selected route (e.g., updated routing navigation instructions 304) assigned to a vehicle. These factors may affect probability calculations which will be discussed below, in choosing the most likely stop locations along a route that a driver will service.

In an embodiment, the training data 206 stored at the server computer 135 may be used to train a machine learning model 210 maintained at the server computer 135. Specifically, by utilizing the training data 206, the machine learning model 210 may be trained to generate suggested route(s) and/or combination of suggested routes including one or more stop locations with a high probability of actually being serviced by particular users and/or vehicles. In an example, the training data 206 may indicate routes with one or more stop locations followed by a vehicle during one or more past instances of travel, where the vehicle is assigned to travel between a starting location and a destination stop location. Once trained using the training data 206, the machine learning model 210 may output routing navigation instructions 304 for a route including an assigned subset of stop locations for a particular vehicle, where the subset of stop locations have a high likelihood of being serviced by the particular vehicle.

Moreover, the machine learning model 210 may generate routing navigation instructions 304 including one or more stop locations for users and/or vehicles, including users and/or vehicles not included in the training data 206. In an embodiment, when the machine learning model 210 is executed with the training data 206, the model 210 may be trained to identify the differences between a past instance of routing navigation instructions 304 with one or more stop locations for a vehicle and the one or more stop locations actually serviced by the vehicle. For example, the machine learning model 210 may be trained to compare the one or more stop locations included in the routing navigation instructions 304 for a bus and the one or more stop locations the bus ultimately serviced, identifying differences in various aspects of the two routes serviced.

As such, the information collected and stored as training data 206 (e.g., device data 202 and/or historical data 204) may be used to help predict stop locations along a route based on the probability of a vehicle servicing the particular stops. In other words, the server computer 135 may use the historical data 204 to calculate the probability of a particular GPS location, more discrete than an address, for a vehicle to stop for a start location and a stop location for a specific ride service. For example, the server computer 135 may automatically select GPS locations identifying a start location and a stop location based on the probability that the start and stop locations are the correct locations to pick up and/or drop off a child, a rider, a good, etc. Then the most probable stop locations may be assigned as start locations, stop locations, and/or destination stop locations along the route and may be provided to a driver as turn-by-turn navigation (e.g., routing navigation instructions 304), as will be discussed in further detail below. In an embodiment, the server computer 135 may further monitor compliance to the routing navigation instructions 304 through GPS data received from the one or more devices 110, 115, 120, 125, 130.

By using the techniques described herein to predict the most probable stop locations along a route serviced and supplying turn-by-turn navigation (e.g., routing navigation instructions 304) for that particular route, the server computer 135 may be capable of more accurately predicting an estimated arrival time (as compared to alternative arrival times determined using conventional routing techniques), which is imperative in many instances. For example, having an accurate prediction of an estimated arrival time is essential when school buses pick up and drop off children. Specifically, a server computer 135 may determine an arrival time to a destination stop location based on the subset of stop locations selected and assigned to a route. In this case, the calculated arrival time may be more accurate than alternative arrival times calculated without using the probability associated with each one of the one or more stop locations for the route. As a result of the techniques described herein, parents may enjoy a heightened accuracy of estimated arrival times, which makes the drop off and pickup process more efficient for the bus driver, the children who ride the bus and the parents of the children.

FIG. 3 illustrates an exemplary machine learning model 210 for optimizing routing navigation instructions 304, according to various embodiments. As discussed in detail above, a machine learning model 210 at a server computer 135 may be trained with training data 206 in the form of historical data 204 and/or device data 202 associated with a vehicle routing system 100. In an example, historical data 204 and/or device data 202, such as travel distance, fuel use, pickup and drop off duration, start locations, various stop locations including destination stop locations, speed of travel, rider verification information, driver and vehicle information, etc., may be converted into inputs for the machine learning model 210. Once trained, the machine learning model 210 may be utilized to generate routing navigation instructions 304 including a subset of stop locations based on the probability that each of the stop locations for the route will be serviced by a vehicle for the route.

In an embodiment, a route service request 302 may be generated by the server computer 135. Specifically, the server computer 135 may receive a request to service a route. For example, the server computer 135 may receive a service request associated with providing a ride service by a vehicle to pick up children in a particular town and to take them to a particular school. In response, the server computer 135 may generate a route service request 302 and assign one or more vehicles in a fleet of vehicles to service the route. In an embodiment, the one or more vehicles may be assigned based on various factors. For example, a vehicle may be assigned to service a route based on the size of the vehicle being suitable for the roads along the route, the number of seats being sufficient for the assigned and/or expected number of passengers, whether or not the vehicle has passed all inspections, etc. Upon generation of the route service request 302, the server computer 135 may be configured to generate and utilize an input in the machine learning model 210. The input can include any combination of information associated with the route service request 302, one or more of the devices 110, 115, 120, 125, 130, user(s) associated with the one or more devices 110, 115, 120, 125, 130, passenger information, historical data 204 (e.g., route navigation data), or any other information required to determine routing navigation instructions 304. For example, a start location, stop locations, and a destination stop location can be generated from the route service request 302 and used as an input for the machine learning model 210.

Responsive to receipt of the route service request 302, the machine learning model 201 may be configured to generate routing navigation instructions 304 identifying a subset of stop locations from one or more stop locations for a current instance and/or future instance of travel of a vehicle between a start location and a destination stop location. In an embodiment, to generate the route navigation instructions 304, a start location for the route and one or more stop locations for the route may be identified. In some embodiments, the one or more stop locations may include a destination stop location for the route. The start location and the one or more stop locations may be identified from among historical data 204 associated with at least one route and/or vehicle collected over a period of time. For example, the historical data 204 at the server computer 135 may include information related to a at least one route and/or vehicle traveling between a start location and a destination stop location. The historical information may be reported to the server computer 135 and stored as historical data 204 during the time period the vehicles are traveling between the start location and the destination stop location. Once the start location and the one or more stop locations for a route are identified, a subset of stop locations may be selected from among the one or more stop locations. For example, five stop locations may be selected from among ten stop locations along a route for a vehicle to service. As discussed in more detail with respect to FIGS. 4 and 5, the selection of the subset of stop locations may be based on the subset of stop locations being more likely to be serviced than the remaining stop locations along the route. In an embodiment, the identified stop locations may be selected based on additional criteria. For example, a stop location along a particular route may be selected based on ensuring a child, assigned to the route, does not cross a road when traveling to or from the stop location or the stop location may be selected based on the child living within a predetermine distance of the identified stop location. In some embodiments, the vehicle routing system 100 may optimize routes and/or stop locations along a route based on the shortest time on the road for each vehicle, based on minimal fuel usage across a fleet, based on minimal emissions across a fleet, or based on any other basis that is meaningful to the entity or community served by the fleet of vehicles. For example, if one stop location for a school bus has a large number of children assigned to board the bus, the optimized vehicle routing system 100 may determine that, since more children are boarding per the identified stop location, the particular school bus may need less time to complete an assigned route.

In an embodiment, once the server computer 135 has automatically selected a subset of stop locations based on the probability associated with each one of the one or more stop locations for the route, the server computer 135 may proceed to assign the subset of stop locations to a route serviced by a vehicle. The server computer 135 may then transmit the routing navigation instructions 304, including the subset of stop locations along the route, to one or more devices 110, 115, 120, 125, 130 of the vehicle routing system 100. For example, routing navigation instructions 304 may be transmitted by the server computer 135 to a driver device 120 associated with the vehicle. In an embodiment, the one or more stop locations may be identified in the routing navigation instructions 304 as a GPS location. For example, a GPS location may be transmitted to a vehicle, where the GPS location indicates an accurate stop location for the vehicle to service along a route. Additionally, the destination stop location may be a part of the subset of stop locations and may also be identified in the routing navigation instructions as a GPS location. For example, the routing navigation instructions 304 may include a set of coordinates indicating a GPS location for a destination stop location. In an embodiment, the routing navigation instructions 304 may further include information such as arrival times for pick up at the stop locations. For example, routing navigation instructions 304 may be provided to a driver device 120 associated with a bus indicating the stop location where a child is to be picked up by the bus, as well, as the time the pickup is to occur. In an embodiment, routing navigation instructions 304 including a subset of stop locations may be transmitted to one or more devices 110, 115, 120, 125, 130 based on the user(s) associated with the device 110, 115, 120, 125, 130. For example, the driver device 120 may be associated with a vehicle assigned to service a particular route and, as a result, routing navigation instructions 304 relating to servicing the route may be transmitted to the driver device 120.

In an embodiment, routing navigation instructions 304, path information, and other relevant information may be displayed on a screen associated with a device the one or more devices 110, 115, 120, 125, 130 via a GUI. For example, routing navigation instructions 304 for the selected route may be displayed on the driver device 120 via a GUI, where the driver device 120 is associated with the vehicle assigned to travel the selected route (e.g., route associated by the routing navigation instructions 304). Various users may receive, via the one or more devices 110, 115, 120, 125, 130, expected vehicle path information (e.g., start location, stop locations, destination stop locations, arrival and depart times associated with each stop location, etc.) from a server computer 135 and displayed via a GUI on the one or more devices 110, 115, 120, 125, 130. For example, a user may utilize a user interface via a GUI on the user device 115 to view a map with vehicle information associated with a particular vehicle. Thus, the user of the user device 115 may be able to track the vehicle associated with the driver device 120 in real-time and observe where the vehicle is currently and when the vehicle will be at a specific stop location, which may be identified by a GPS location. Moreover, routing information (e.g., route navigation data including stop location serviced by the bus, passengers assigned to the bus, etc.) may also be transmitted to one or more devices 110, 115, 120, 125, 130 based on the user(s) associated with the device 110, 115, 120, 125, 130. For example, a user device 115 may be associated with various users, such as a parent/guardian of a child bus rider, and, as a result, routing information relating to picking up the child bus rider may be transmitted to the user device 115.

The user device 115 may be implemented as separate devices where a first user device 115 is associated with the child rider and a second user device 115 is associated with a parent, guardian, or other supervisor of a child. In this instance, routing information relating to the picking up of the child may be sent to both the first user device 155 associated with the child and the second user device 115 associated with the parent, guardian, or other supervisor of the child. In another example, the server computer 135 may transmit individual route information associated with the selected route (e.g., a route associated with the routing navigation instructions 304) to a bus driver via the driver device 120 of the vehicle routing system 100. For instance, the driver device 120 may receive a route including optimally selected stop locations from the server computer 135 for picking up a ride requester, such as a child, based on location information associated with the ride requester, such as a home or a school address and/or prior pickup/drop off history locations for children on a particular route. The individual route information may include a mandatory bus route for the driver to follow with a stop sequence at particular stop locations that are identified along the individual route. The individual route information may also include turn-by-turn navigation instructions (e.g., route navigation instructions 304) with expected drive time duration, arrival times at stop locations, departure times from stop locations, and distances between stop locations, based on historical rides (e.g., historical data 204).

As discussed with respect to FIG. 2 above, the machine learning model 210 may be iteratively trained using data 202, 204 continuously and/or intermittently received at the server computer 135. Information, such as route navigation data, may be detected by or input into one or more devices 110, 115, 120, 125, 130 associated with the vehicle routing system 100 and transmitted to the server computer 135. For example, a driver device 120 may transmit data 202, 204 intermittently to the server computer 135. In an embodiment, the received data 202, 204 may be associated with route information. For example, the data 202, 204 may be associated with road conditions such as, new construction, a road closure, new stop locations, closed stop locations, etc. Moreover, the route information may further include distance traveled information, fuel use information, pickup duration information, stop location information (e.g., information about where the stop location is designated versus where the stop location actually occurred), speed of travel information (in terms of actual speeding and in terms of slowdowns caused by traffic, construction, or any other road condition), rider verification information, rider disembarking information, and any other information that may be used by the server computer 135 to optimize routing. When the data 202, 204 is received, the server computer 135 may update the datastore 208 based on the data 202, 204. As a result, the updated data 202, 204 at the datastore 208 may then be implemented to iteratively train the machine learning model 210 to produce updated routing navigation instructions 304. For example, the server computer 135 may receive information from a driver device 120 which may be used to optimize routes based on learning from past driver routes and/or driver input to the driver device 120 (e.g., information indicating a new stop location or information such as a street closure, construction, etc.). Moreover, future selected routes (e.g., routes associated with the routing navigation instructions 304) generated by the server computer 135 may further be based on the updated data 202, 204. For example, routing navigation instructions 304 may be optimized for picking up children based on updated data 202, 204 including a home or school address and/or prior pickup/drop stop locations for the children. In an embodiment, the machine learning model 210 may be iteratively trained using the updated data 202, 204 to optimize various aspects of the vehicle routing system 100. For example, the routing navigation instructions 304 may be updated to optimize the enforcement of particular driving patterns, such as optimizing a route and stop locations along the route to prevent U-turns, to enforce curbside pickup to avoid children crossing streets, etc. In another example, the server computer 135 may receive information from a driver device 120 which may be used to optimize the routing navigation instructions 304 based on learning from past driver routes to determine a best path between stop locations.

In an embodiment, the server computer 135 may track a vehicle via one or more devices 110, 115, 120, 125, 130 during travel and ensure compliance with the optimized route. For instance, if the one or more devices 110, 115, 120, 125, 130 indicates that a vehicle is not following the optimized routing navigation instructions 304, the server computer 135 may send a message to the one or more devices 110, 115, 120, 125, 130, to allow either the users of said devices 110, 115, 120, 125, 130 or the server computer 135 to contact the driver of the vehicle with route correction instructions to enhance adherence to the routing navigation instructions 304. The server computer 135 may update the datastore 208 based on this lack of compliance with the turn-by-turn navigation instructions (e.g., routing navigation instructions 304) to inform the machine learning model 210 of new likely routes and/or stop locations along a route for at least one particular driver. In an embodiment, based on lack of compliance with the routing navigation instructions 304, the server computer 135 may assign one or more alternative vehicles to service a route and/or may assign one or more stop locations to be serviced by one or more alternative vehicles.

When a vehicle is servicing a route, a real time location may be provided to one or more devices 110, 115, 120, 125, 130. For example, the real time location for a bus may be provided to a user device 115 so that the child assigned to said bus may identify, using the user device 115, where the bus is currently located as well as the arrival time of the bus at a particular stop location. Based on information received from one or more devices 110, 115, 120, 125, 130, the server computer 135 may maintain estimated global positioning system ("GPS") stop locations and estimated time of arrival ("ETA") information for each ride, which may be constantly updated based on information provided by one or more devices 110, 115, 120, 125, 130. This ETA information may be more accurate than what is currently available (e.g., may provide a more accurate arrival time as compared to an alternative arrival time generated using conventional routing techniques) because the ETA is based on the probability that each stop location for a route will be serviced by a vehicle assigned to travel said route and may be updated based on deviations to the route in real-time as compared to conventional routing techniques which are based on the fastest route between two places (e.g., alternative arrival time). For example, the arrival time to the destination based on the subset of stop locations may be more accurate than an alternative arrival time calculated without using the probability associated with each one of the one or more stop locations for the route, such as a route randomly chosen by a vehicle driver. As a result, the one or more devices 110, 115, 120, 125, 130 may be able to provide real-time routing, navigation, and path information based on a current location of the one or more devices 110, 115, 120, 125, 130. The GPS information maintained by the server computer 135 may further be used along with information received from the one or more devices 110, 115, 120, 125, 130 and/or the historical data 204 to optimally route a fleet of vehicles. Specifically, based on the information received from the one or more devices 110, 115, 120, 125, 130 and/or the historical data 204, the vehicle routing system 100 may determine a distance between identified stop locations and a travel time between each of those identified stop locations to determine both a route for a single vehicle and the number of vehicles required for a plurality of routes. For example, based on a standard bus configuration, a school bus may transport 80 seated students. However, on a route with 90 students, due to space, time, and distance constraints, a certain bus may only be able to pick up 45 students at identified stop locations. Thus, a second bus may be assigned to a subset of stop locations along the route to ensure that the additional 45 students are picked up.

Figure 4A:
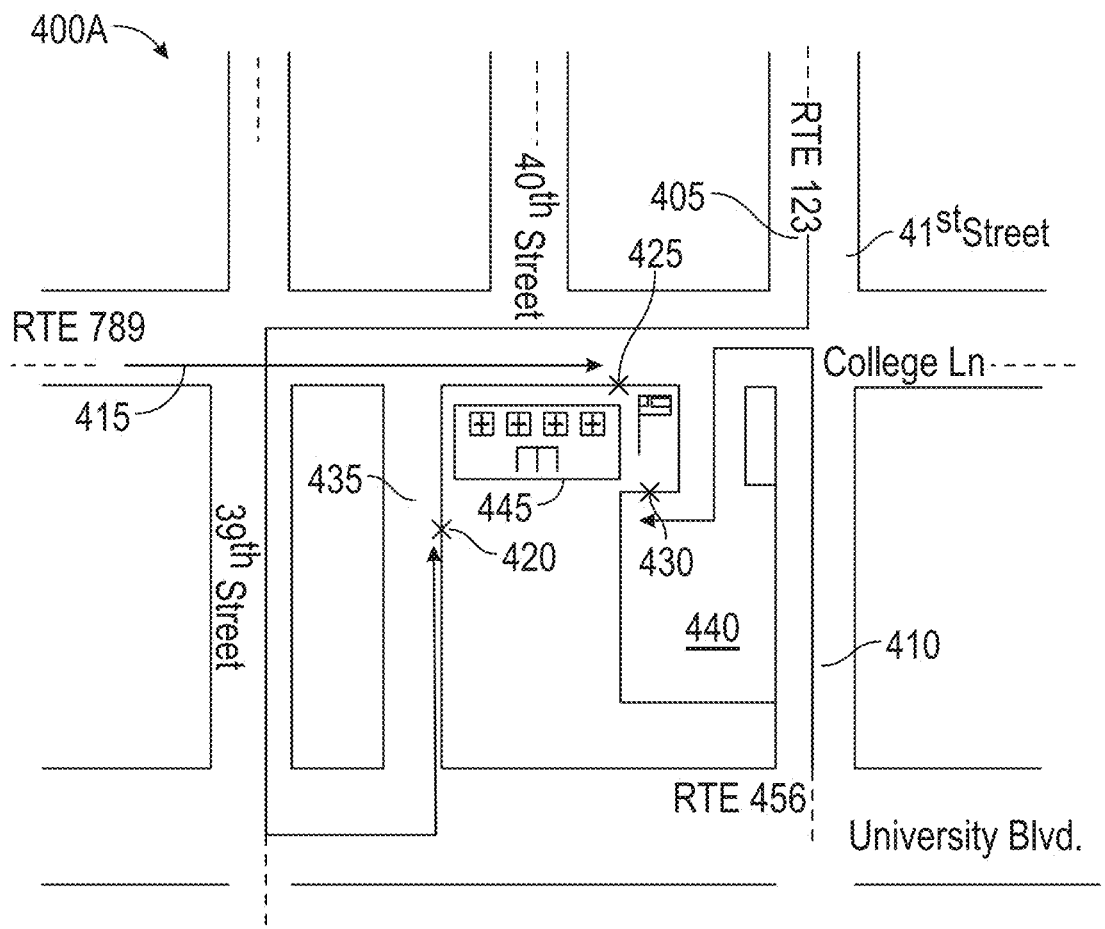
FIG. 4A illustrates an exemplary morning vehicle routing scenario with probable stop locations for one or more vehicles, according to various embodiments.

FIG. 4A illustrates an exemplary morning vehicle routing scenario 400A with probable stop locations 420, 425, 430 for one or more vehicles 405, 410, 415, according to various embodiments. As shown in FIG. 4A, several vehicles 405, 410, 415, which may be school buses, are attempting to drop children off at a school. For example, on Route 123, element 405 represents a school bus 405 arriving from the north (e.g., proceeding south on 41st Street) of the school. The school bus 405 is servicing route 123 and is guided to proceed down $39^{th}$ Street and up to use drop off lane 435 to drop off the students onboard. On Route 456, element 410 represents a school bus 410 arriving from the south and east (e.g., proceeding north on 41 st Street). The school bus 410 is servicing route 456 and is guided to turn left on College Lane and into parking lot 440 to drop off the students onboard. On Route 789, element 415 represents a school bus 415 arriving from the west (e.g., proceeding east on College Lane). The school bus 415 is servicing route 789 and is guided to stop in front of the school 445.

The server computer 135 may maintain information (e.g., historical data 204) associated with each vehicle 405, 410, 415 assigned to each route. Based on this information, the server computer 135 may identify a type of vehicle, a type of passenger, particular passenger(s), and/or one or more stop locations along a route. For example, the server computer 135 may identify whether a bus is a standard size bus, a short bus, a disabled bus, or another type of vehicle. In another example, the server computer 135 may identify a stop location with a set of coordinates. The server computer 135 may further utilize the historical data 204 to determine an association between a type of vehicle servicing a route and/or a particular passenger assigned to a route and/or one or more stop locations (e.g., a subset of stop locations included in the routing navigation instructions 304) along the route. Specifically, the server computer 135 may determine that a stop location, among the subset of stop locations, has a particular set of coordinates when the vehicle and/or passengers assigned to the vehicle are of a particular type. However, the server computer 135 may determine that the stop location has a different set of coordinates when the vehicle and/or passengers assigned to the vehicle are of a different type. For example, the server computer 135 may identify an association between a standardized bus servicing a route and a stop location with a particular set of coordinates for drop off of a first set of children along the route. However, the server computer 135 may identify an association between the standardized bus servicing the route and a stop location with a different set of coordinates for drop off of a second set of children along the route. In other words, if a vehicle is a small bus and/or has a disabled passenger, then the vehicle may drop off kids at a first stop location using a first set of coordinates. However, if the vehicle is a large bus and/or does not include a disabled passenger (e.g., does not need to accommodate the needs of a disabled passenger), then the vehicle may drop off kids at a second stop location using a second set of coordinates. In some embodiments, the stop locations may be a predetermined distance from each other and serviced by the same vehicle. For example, a vehicle may service a subset of stop locations selected based on differing associations between the vehicle, passengers, and/or stop locations. Overall, the determined associations may indicate criteria particular to a certain type of vehicle and/or a certain type of passenger. For example, the server computer 135 may determine an association that indicates the particular rules a school has for dropping off certain children in certain locations, such as a rule that a bus with elementary aged students can only drop those students off at the drop off location 430 in the parking lot 440.

As shown in FIG. 4A, standard size buses may be assigned to drop off children in drop off lane 435. The server computer 135 may identify that standard size buses are often routed to a GPS location (e.g., a set of coordinates) associated with drop off lane 435 for dropping off children for school. Thus, the server computer 135 may collect each historical drop off GPS location for a particular route or other routes that use the same kind of vehicle and calculate a probability of a particular GPS location (e.g., drop off location 420) being the correct stop location 420 for dropping off children at the drop off lane 435. Next, the server computer 135 may automatically select, based on historical data 204 and the probability that the most used stop location 420 is the correct stop location to drop off children, a GPS location (e.g., a set of coordinates) identify drop off location 420 for a standard sized bus associated with route 123. The server computer 135 may then assign the drop off location 420 identified by a particular GPS latitude and longitude coordinate system to a specific stop location 420. As a result, the assigned stop location 420 may be more discrete than a general address (e.g., drop off lane 435 or school 445) for dropping off the children on route 123.

At the same time, along Route 456, element 410 may be known to the server computer 135 as a vehicle 410 carrying a disabled student on a standard sized bus. The server computer 135 may use historical data 204 to determine that an exception has been made for element 410 of route 456 to allow the vehicle 410 to drop off students in parking lot 440 at drop off location 430. The server computer 135 may use the historical drop off GPS location (e.g., historical data 204) for a particular route or other routes that use the same kind of vehicle as element 410 and calculate a probability of the particular GPS location (e.g., drop off location 430) being the correct stop location for dropping off children for this route. Then, the server computer 135 may automatically select the stop location 430 based on the historical data 204, even though, in this case, a standard size bus is normally routed to drive to drop off location 420 of the drop off lane 435 based on the probability that this particular vehicle 410 should be treated differently. The drop off location 430 may then be assigned based on the determined probability.

Element 415 servicing Route 789 may be known to the server computer 135 as a short bus which carries a small number of students. The server computer 135 may use historical data 204 to determine that short bus vehicles are assigned to drop off students in front of the school 445. The server computer 135 may identify that the short bus associated with route 789 and element 415 historically stops in front of the school 445 on College Ln. Here, the server computer 135 may calculate a probability that a certain GPS location (e.g., stop location 425) is the most likely correct stop location for dropping off the students. In turn, the server computer 135 may automatically select the stop location 425 as a GPS coordinate to route the short bus (e.g., vehicle 415) associated with Route 789 to stop location 425.

Probability calculations will be further discussed below and may apply to some or all probability calculations discussed herein. Briefly, to prepare for further discussion and in one example, a server computer 135 may determine based on historical data 204 that the correct stop location for Route 123 serviced by vehicle 405 is somewhere on the right side of the drop off lane 435 between University Blvd. and College Ln. In other words, the server computer 135 may determine that there is a 100% probability that the right side of the drop off lane 435 is a stop location based on historical data 204 and the determination that every other iteration of Route 123 serviced by vehicle 405 has stopped somewhere along the right side of the drop off lane 435. However, the server computer 135 may determine that Route 123 serviced by vehicle 405 typically ends within the northern third of drop off lane 435 (e.g., greater than 50% of the GPS locations for dropping off children are in the northern third of the drop off lane 435) which may be because the vehicle 405 that serves Route 123 often arrives earlier than other vehicles 410, 415. Based on the historical data 204, the server computer 135, by calculating the likelihood that vehicle 405 servicing Route 123 should terminate at a point in the northern third of the drop off lane 435, may identify stop location 420 as the most probable stop location for the vehicle 405 servicing route 123. In response, the stop location 420 may be automatically selected by the server computer 135 for use and assigned to the routing navigation instructions 304 for the vehicle 405 servicing Route 123. It is noted that in this example, for clarity of explanation, only three different routes (e.g., Route 123, Route 789, and Route 456) are shown and discussed out of what may be many more actual routes in a real world implementation.

Figure 4B:
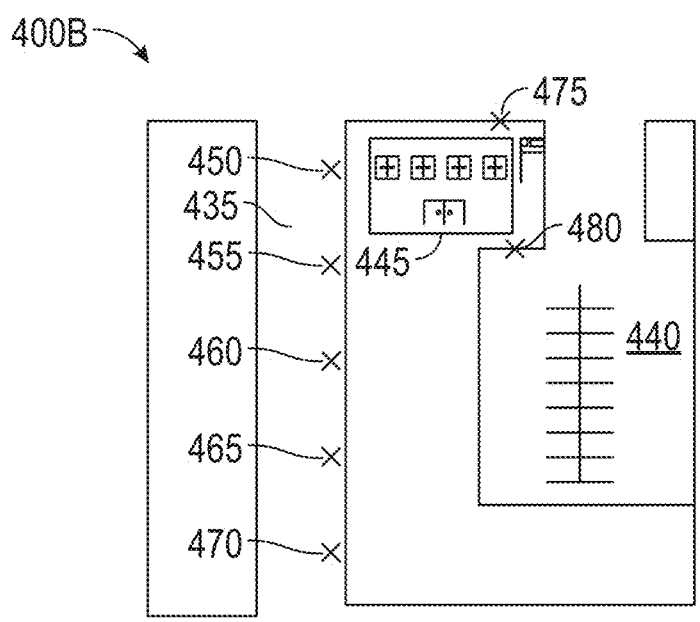
FIG. 4B illustrates an exemplary afternoon vehicle routing scenario with probable stop locations for one or more vehicles, according to various embodiments.

FIG. 4B illustrates an exemplary afternoon vehicle routing scenario 400B with probable stop locations 450, 455, 460, 465, 470, 475, 480 for one or more vehicles, according to various embodiments. As shown in FIG. 4B, a plurality of stop locations 450, 455, 460, 465, 470, 475, 480 have been identified by the server computer 135 for picking up students after school, for example. While, in the example, seven buses are expected for picking up students, in a real world example there may be more or fewer buses and the number seven should be considered as exemplary of one or more buses which may service a particular school, such as school 445. In the exemplary afternoon vehicle routing scenario 400B, the server computer 135 may identify, based on the probability of the one or more stop locations will be serviced by vehicle(s) for the route, that each one of the plurality of buses expected to service a route beginning at school 445 (e.g., picking up children to take them home) will stop at a particular GPS location 450, 455, 460, 465, 470, 475, 480 (e.g., a subset of the one or more stop locations) within the school grounds. The server computer 135 may identify the routes and types of vehicles and/or passengers associated with each route and select GPS locations 450, 455, 460, 465, 470, 475, 480 (e.g., a subset of stop locations among one or more stop locations) for picking up children, where the selected GPS locations 450, 455, 460, 465, 470, 475, 480 have the highest probability that the stop locations 450, 455, 460, 465, 470, 475, 480 will be serviced by a vehicle for the route. For example, the server computer 135 may identify that five standard size buses, based on historical data 204, typically line up within drop off lane 435 based on the first vehicle to arrive for a route service request 302. The server computer 135 may determine that a route should begin at stop location 450 based on the historical probability that the standard size bus associated with that route is first in line in the drop off lane 435 (e.g., greater than 50% of each instance of the route being performed begins at stop location 455 for pickup and greater than 90% of each instance of the route being performed begins at stop location 450). Based on the historical data 204, the server computer 135 may automatically select stop location 450 (e.g., a subset of the one or more stop locations) for this particular route and may assign the stop location 450 to the route based on a GPS identified location.

The server computer 135 may iteratively identify routes associated with a subset of stop locations 455, 460, 465, and 470 and select the subset of stop locations 455, 460, 465, and 470 for particular routes based on the probability of historical stop locations (e.g., historical data 204) for those particular routes. For example, a route associated with stop location 470 may be determined by the server computer 135 to be the most probable stop location as 40% of all instances of this route use stop location 470 while only 30% of all instances of this route use stop location 465 and 30% of all instances of this route use stop location 450 (e.g., the school bus is so late that the remaining buses have all departed, causing the bus servicing this route to drive to the end of the drop off lane 435). Given that the highest probability indicates that the bus, in this example, will stop at stop location 470, the server computer 135 may proceed to selects the stop location 470 for this particular route. Once the server compute 135 assigns the stop location 470 to the particle route, the server computer 135 may provide turn-by-turn route navigation instructions 304 to the driver to direct the driver to the stop location 470 based on a GPS based location for stop location 470. There are several advantages to optimizing a vehicle routing system 100 using the techniques described here. For example, the vehicle routing system 100 may enable each bus to be located in virtually the same location every day the route is serviced which makes finding the correct bus much easier for children. At the same time, the school administrators may enjoy the benefit of having an orderly and safe system for ensuring that children are loaded on the correct bus. Drivers may further enjoy the benefit of having an orderly traffic situation for managing pickup and drop off of children each day.

In an embodiment, the server computer 135 may determine that, based on various information received, a stop location may be moved to a stop location with a lower associated probability. For example, stop location 475 may be associated with a short bus and stop location 480 in parking lot 440 may be associated with picking up a disabled child after school. The probability that buses associated with these particular stop locations 475, 480 may service these locations may be 100% as these buses are special purpose buses in this scenario (e.g., the historical data 204 indicates that a vehicle servicing an associated route has a 100% probability to service these stop locations 475, 480). However, the server computer 135 may receive information which indicates that the stop locations 475, 480 may need to be moved at a driver's discretion. For example, the server computer 135 may receive data indicating that a storm drain has backed up obstructing stop locations 475, 480, a car accident has damaged the curb near stop locations 475, 480, or a significant snow storm has left a large pile of snow due to plowing obstructing stop locations 475, 480. The server computer 135, recognizing that stop location 475 or 480 may be moved at the driver's discretion, may then associate an alternative GPS location to the stop locations 475, 480, such that the stop locations 475, 480 are accessible. In turn, the data collected related to the relocation of the stop locations 475, 480 may be used in future vehicle routing scenarios 400A, 400B. For example, in a future vehicle routing scenario 400A, 400B, the server computer 135 may calculate that there is a 20% chance, based on historical data 204 for servicing the route (e.g., route navigation data), that the stop location 475 was relocated to another position on College Lane. Moreover, the server computer 135 may calculate a probability that is no longer a 100% chance that stop location 475 will be used by the driver.

Figure 5:
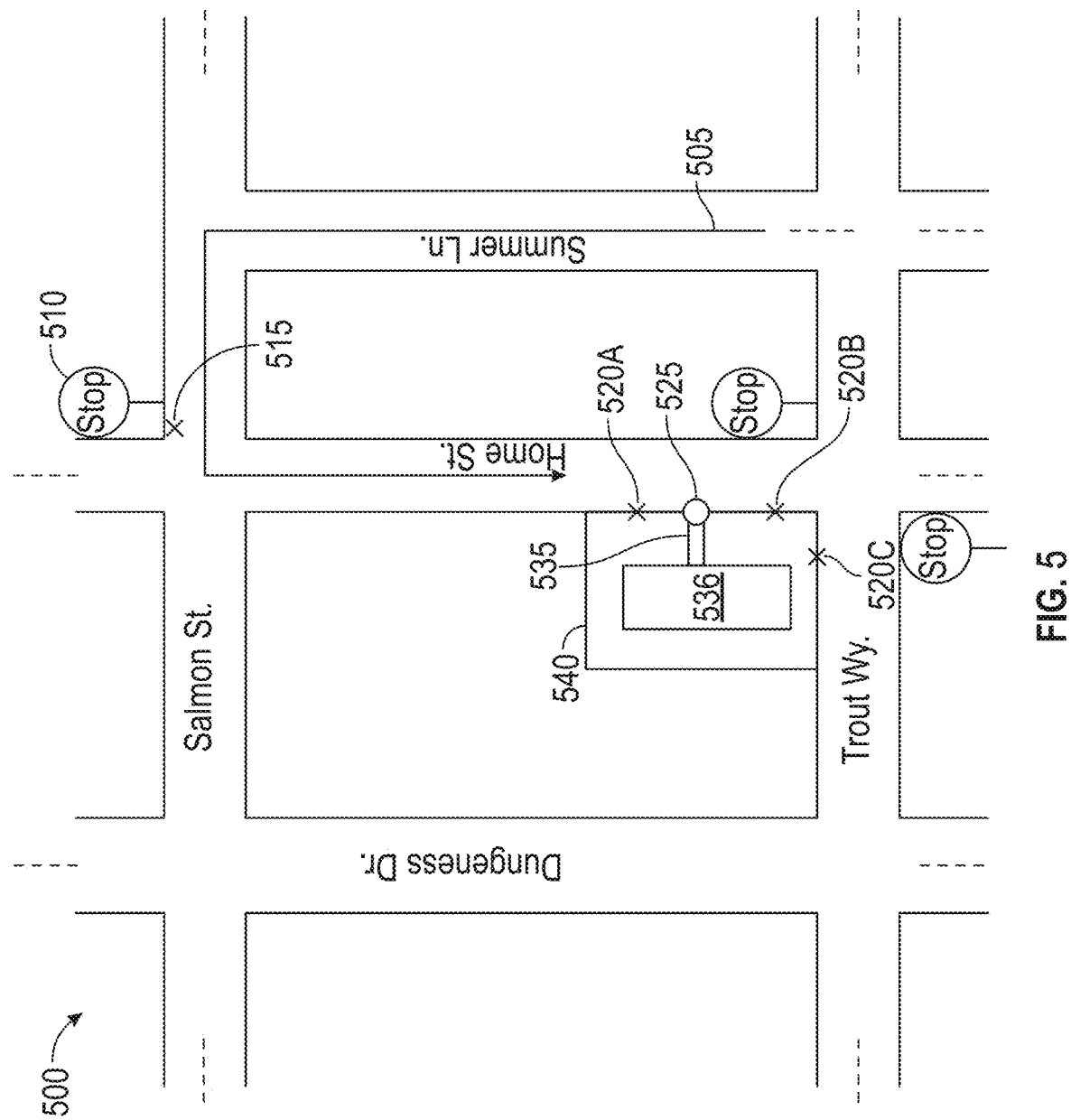
FIG. 5 illustrates an exemplary morning or afternoon vehicle routing scenario for residential based routing, according to various embodiments.

FIG. 5 illustrates an exemplary morning or afternoon vehicle routing scenario 500 for residential based routing, according to various embodiments. As shown in FIG. 5, the server computer 135 has assigned a vehicle to route 505, which, for this example, travels north on Summer Lane, turns left onto Salmon Street and stops at stop sign 510 at stop location 515. This stop location 515 is representative of a subset of one or more stop locations that may occur during performance of the ride service along the route 505. In an embodiment, a stop location may be associated with various reasons to stop during the performance of a ride service. For example, a stop location may be associated with a stop lights, intersections, stop signs, railroad track crossings, bridges, stream crossings, etc. The server computer 135 may identify GPS locations (e.g., a set of coordinates) for the stop locations where it may be required for a vehicle to stop. For example, a GPS location may identify a stop location where a vehicle is required to stop at a railroad track crossing for the purpose of gaining a clear view of a potential oncoming train. As discussed in detail above, the identified GPS stop locations (e.g., sets of coordinates), such as stop location 515, may be determined from historical data 204 with respect to prior services of a route service being performed. For example, stop location 515 may be positioned slightly behind stop sign 510 because a visual obstruction, such as a wall or a large tree, hinders the ability of the driver to safely turn left from Salmon St. to Home St. Since previous drivers and route services have stopped at stop location 515, stop location 515 is identified by the server computer 135 as the most probable stop location for compliance with a known stop sign. In an embodiment, the server computer 135 may further determine driver quality based on compliance with stopping at the server computer 135 identified, selected, and assigned stop locations for each stop event.

In an embodiment, one or more stop locations (e.g., a start location, one or more of the subset of stop locations, the destination stop location, etc.) may be identified as a geographic zone. For example, a gated community may be identified as a geographic zone for a stop location, where a specific stop location within the gated community is not specified. In this embodiment, a vehicle may proceed to select the most appropriate location to stop within the geographic zone. For example, as illustrated in FIG. 5, once a left turn on to Home Street is accomplished by a vehicle, a stop location identifying a geographic zone may be provided for dropping off one or more children. Specifically, the server computer 135 may identify an acceptable area (e.g., geographic zone) for drop off, which may be identified as geographic zone 540 by GPS coordinates (e.g., a set of coordinates) defining the geographic zone 540. Since identifying a stop location in a residential area may be more difficult to define, geographic zone 540 may allow a driver some flexibility in determining where the best and safest drop off location is while also identifying a particular stop location as having the highest probability of being the stop location, automatically selecting that stop location based on the stop location being the highest probability stop location, and assigning that stop location to the route.

As discussed, the server computer 135 may continuously update the one or more stop locations. For example, a typical stop location may be assigned as stop location 525 which is associated with the walkway 535 to the doorstep of house 536. As a result, the server computer 135 may correlate the house 536 address to the assigned stop location 525. However, over time, a driver may observe that a child does not use the walkway 535 to enter the home 536 and instead prefers to enter through a garage entry. In turn, the driver may ignore the suggested stop location 525 and proceed to stop at stop location 520A. Data (e.g., route navigation data) indicating the driver's choice of stop location 520A may be sent to the server computer 135 and, as a result, the server computer 135 may determine, based on the data received, that the driver often stops at stop location 520A more than at stop location 525. The server computer 135 may then proceed to determine that the probability that a particular driver will stop at stop location 520A is more likely than stop location 525 and the stop location may be updated by the server computer 135 automatically selecting stop location 520A for a drop off location and assigning stop location 520A to the route.

In another example, the server computer 135 may determine from historical ride service data/route navigation data (e.g., historical data 204) that stop locations 520A, 520B, and 520C are all stop locations that have been historically used by one or more vehicles. For example, a new driver may be assigned to the route and the server computer 135 may identify, select, and assign a stop location based on pure probability. The server computer 135 may determine, based on the historical data 204, that there is a 70% likelihood that a driver is likely to stop at stop location 520A, 25% likelihood that a driver is likely to stop at stop location 520B, and a 5% likelihood that a driver is likely to stop at stop location 520C. Consequently, the server computer 135 may identify stop location 520A as the stop location with the highest likelihood for the driver to use. Then the server computer 135 may proceed to automatically select the stop location 520A for use in the route and assign the stop location 520A, based on GPS location (e.g., a set of coordinates), to the route. In this manner, the bus and the driver may precisely service the drop off location. Once the stop location 520A has been serviced, the bus may continue west on Trout Way through Dungeness Drive and continue servicing route 505.

Figure 6:
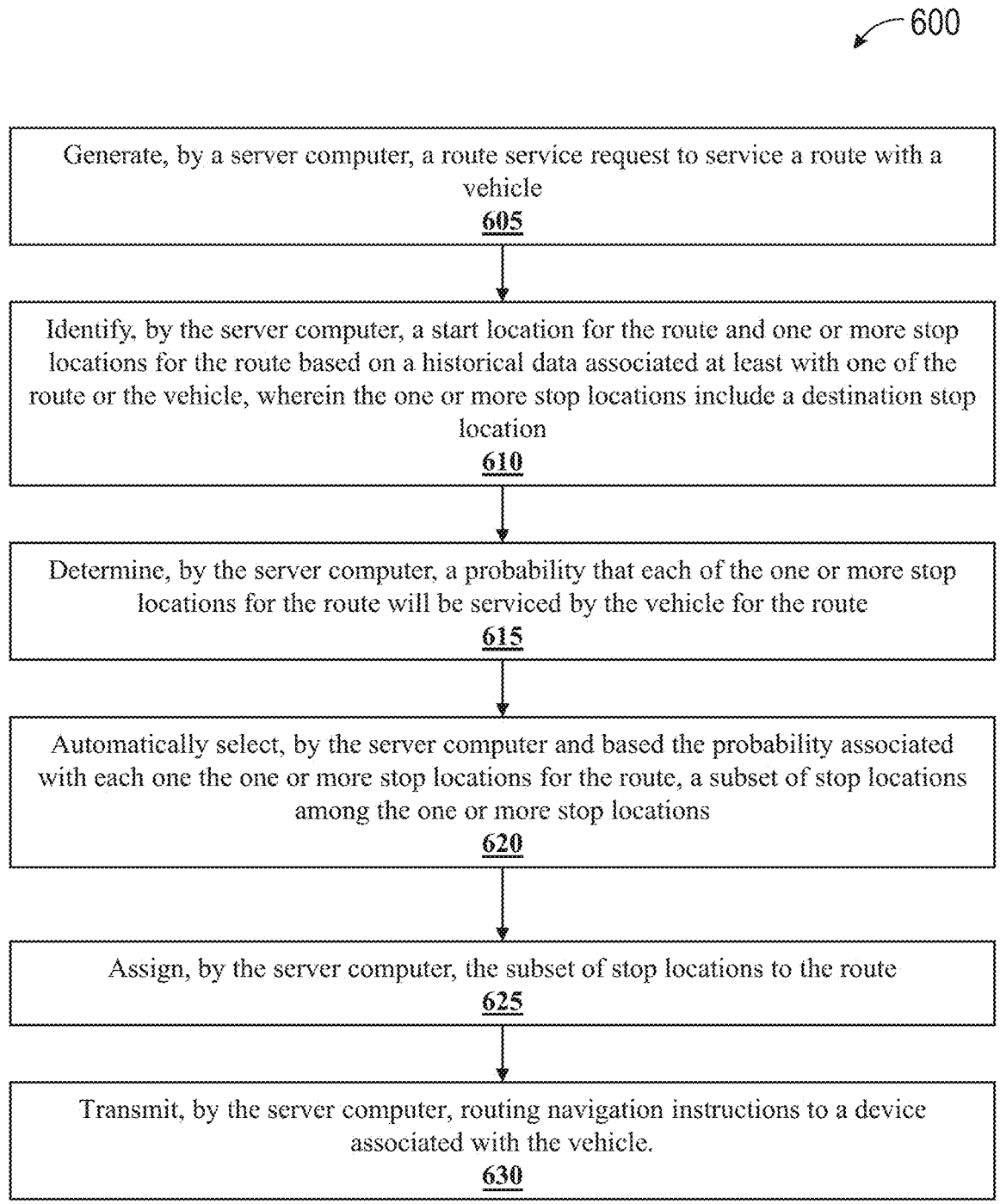
FIG. 6 illustrates an exemplary method for determining a subset of stop locations for a vehicle servicing a route, according to various embodiments.

FIG. 6 illustrates an exemplary method 600 for determining a subset of stop locations for a vehicle servicing a route, according to various embodiments. Method 600 begins at step 605 where the server computer 135 generates a route service request to service a route with a vehicle. The server computer 135 may initially receive a request to service a route. For example, a request to pick up children in a particular town and transport them to particular school may be received by the server computer 135. An administrator may make the route request, for example, using administrator device 125 to provide a new route service for a particular school. The route request may include a list of passengers (or potentially goods) for transportation along with identifying a location where the passengers are to be delivered (e.g., a school). In response, the server computer 135 may generate a route service request 302 and assign one or more available vehicles in a fleet of vehicles to service said route. For example, the server computer 135 may select a vehicle to service the route based on various factors, such as the size of the vehicle being suitable for roads in the particular town, the amount of seats of available for passengers, whether the vehicle has passed all inspections, etc.

The method 600 may proceed to step 610 where the server computer 135 may optimize a route by identifying a start location for a route and one or more stop locations for the route, where the one or more stop locations may include a destination stop location. The start location and one or more stop locations may be based on historical data 204 (e.g., route navigation data) associated with at least one of a route or vehicle. For example, historical data 204 indicating the GPS based location for picking up a child from school may be used to identify a stop location associated with the GPS location. In some cases, the server computer 135 may include all stop locations along a route. For example, the server computer 135 may include any stop sign, stop light, or other traffic hazard indicated in the historical data 204.

At step 615, the server computer 135 may determine a probability that each of the one or more stop locations for the route will be serviced by the vehicle for the route. For example, the server computer 135 may determine that a first stop location has a 70% probability of being serviced by a vehicle along a route and a second stop location has a 30% probability of being service by a vehicle along the route. At step 620, the server computer 135 may proceed to automatically select a subset of stop locations among the one or more stop locations. The selection of the subset of stop locations may be based on the probability associated with each one of the one or more stop locations for the route. For example, the server computer 135 may automatically select first stop location with 70% probability, while not selecting the second stop location as it has a probability under 50%. Each of the start location and the one or more stop locations may be GPS based locations identified by a set of coordinates. For example, a stop location may identify a particular location described by a latitude and longitude system.

At step 625, the server computer 135 may assign the subset of stop locations to the route. For example, the first stop location with 70% probability may be assigned by the server computer 135 to the route associated with the route service request. Then, at step 630, the server computer 135 may transmit routing navigation instructions 304 to a device associated with the vehicle. For example, turn-by-turn routing navigation instructions including the subset of stop locations may be transmitted to a driver device 120 associated with the vehicle assigned to service the route. Moreover, data associated with servicing the route, such as compliance data and route navigation data, may be collected throughout the servicing of the route, received by the server computer 135, and stored in a datastore 208. The collected data (e.g., route navigation data) may become historical data 204, which may be used to identify stop locations for future instances of travel. For example, the data collected may be used to iteratively train the machine learning model 210 to provide updated routing navigation instructions 304 in future instances of travel.

The foregoing description has been presented for the purposes of illustration and description. It is not intended to be exhaustive or to limit the disclosure to the precise form disclosed. Many modifications and variations are possible in light of the above disclosure and teachings. Further, it should be noted that any or all of the aforementioned alternate implementations may be used in any combination desired to form additional hybrid implementations of the disclosure. For example, components described herein may be removed and other components added without departing from the scope or spirit of the embodiments disclosed herein or the appended claims.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system, comprising:
   a server computer comprising a processor and a memory storing instructions that, when executed by the processor, cause the processor to perform steps comprising:
   generating a route service request to service a route with a vehicle;

identifying a start location for the route and one or more stop locations for the route based on a historical data associated at least with one of the route or the vehicle, wherein the one or more stop locations include a destination stop location;

determining a probability that each of the one or more stop locations for the route will be serviced by the vehicle for the route;

automatically selecting, based on the probability associated with each one of the one or more stop locations for the route, a subset of stop locations among the one or more stop locations;

assigning the subset of stop locations to the route; and transmitting routing navigation instructions to a device associated with the vehicle.

2. The system of claim 1, wherein the one or more stop locations are identified in the routing navigation instructions as a GPS location.

3. The system of claim 1, wherein the instructions, when executed by the processor, cause the processor to perform steps further comprising:

training a machine learning algorithm based on the one or more stop locations used by one or more vehicles assigned to travel between the start location and the destination stop location in one or more past instances; and implementing the machine learning algorithm to identify the subset of stop locations among the one or more stop locations for a current instance to travel between the start location and the destination stop location.

4. The system of claim 1, wherein the destination stop location is part of the subset of stop locations and is identified in the routing navigation instructions as a GPS location.

5. The system of claim 1 wherein a stop location among the subset of stop locations has a first set of coordinates when the vehicle or passengers assigned to the vehicle are of a first type, and the stop location has a second set of coordinates different than the first set of coordinates when the vehicle or passengers assigned to the vehicle are of a second type, wherein the first set of coordinates and the second set of coordinates are within a predetermined distance of each other.

6. The system of claim 1, wherein at least one of the subset of stop locations is based in part on a type of vehicle servicing the route or passengers assigned to the vehicle.

7. The system of claim 1, wherein at least one of the start location, one or more of the subset of stop locations, and the destination stop location is identified as a geographic zone.

8. The system of claim 1, wherein the server computer further collects route navigation data during performance of servicing the route.

9. The system of claim 1, wherein the instructions, when executed by the processor, cause the processor to perform steps further comprising:

determining an arrival time to the destination stop location based on the subset of stop locations, wherein the arrival time is more accurate than an alternative arrival time calculated without using the probability associated with each one of the one or more stop locations for the route.

10. The system of claim 1, wherein the instructions, when executed by the processor, cause the processor to perform steps further comprising:

the device associated with the vehicle displaying the routing navigation instructions.

11. The system of claim 1, wherein each element of the historical data associated at least with one of the route or the vehicle is associated with a coefficient indicative of an age of the element of the historical data, wherein the element of the historical data is weighed using the coefficient.

12. A method comprising:

generating, by a server computer, a route service request to service a route with a vehicle;

identifying, by the server computer, a start location for the route and one or more stop locations for the route based on a historical data associated at least with one of the route or the vehicle, wherein the one or more stop locations include a destination stop location;

determining, by the server computer, a probability that each of the one or more stop locations for the route will be serviced by the vehicle for the route;

automatically selecting, by the server computer and based the probability associated with each one the one or more stop locations for the route, a subset of stop locations among the one or more stop locations;

assigning, by the server computer, the subset of stop locations to the route; and transmitting, by the server computer, routing navigation instructions to a device associated with the vehicle.

13. The method of claim 12, wherein the one or more stop locations are identified in the routing navigation instructions as a GPS location.

14. The method of claim 12, further comprising:

training a machine learning algorithm based on the one or more stop locations used by one or more vehicles assigned to travel between the start location and the destination stop location in one or more past instances; and implementing the machine learning algorithm to identify the subset of stop locations among the one or more stop locations for a current instance to travel between the start location and the destination stop location.

15. The method of claim 12, wherein a stop location among the subset of stop locations has a first set of coordinates when the vehicle or passengers assigned to the vehicle are of a first type, and the stop location has a second set of coordinates different than the first set of coordinates when the vehicle or passengers assigned to the vehicle are of a second type, wherein the first set of coordinates and the second set of coordinates are within a predetermined distance of each other.

16. The method of claim 12, wherein at least one of the subset of stop locations is based in part on a type of vehicle servicing the route or passengers assigned to the vehicle.

17. The method of claim 12, wherein at least one of the start location, one or more of the subset of stop locations, and the destination stop location is identified as a geographic zone.

18. The method of claim 12, wherein the server computer further collects route navigation data during performance of servicing the route.

19. The method of claim 12, further comprising:

determining an arrival time to the destination stop location based on the subset of stop locations, wherein the arrival time is more accurate than an alternative arrival time calculated without using the probability associated with each one of the one or more stop locations for the route.

20. A non-transitory computer-readable medium storing instructions that, when executed on a server computer, cause the server computer to perform steps comprising:

generating a route service request to service a route with a vehicle;
identifying a start location for the route and one or more stop locations for the route based on a historical data associated at least with one of the route or the vehicle, wherein the one or more stop locations include a destination stop location;
determining a probability that each of the one or more stop locations for the route will be serviced by the vehicle for the route;
automatically selecting, based the probability associated with each one the one or more stop locations for the route, a subset of stop locations among the one or more stop locations;
assigning the subset of stop locations to the route; and
transmitting routing navigation instructions to a device associated with the vehicle.

* * * * *